United States Patent
Ryoo et al.

(10) Patent No.: US 8,797,845 B2
(45) Date of Patent: Aug. 5, 2014

(54) FAILURE RECOVERY METHOD IN NON REVERTIVE MODE OF ETHERNET RING NETWORK

(75) Inventors: Jeong-Dong Ryoo, Daejeon (KR); June-Koo Rhee, Daejeon (KR); Bheom-Soon Joo, Daejeon (KR); Jin-Sung Im, Ulsan (KR); Zahir Uddin Ahmad, Daejeon (KR); Yang Yang, Shenzhen (CN); Marc Holness, Nepean (CA)

(73) Assignees: Electronics and Telecommunications Research Institute, Daejeon (KR); Korea Advance Institute of Science and Tecnology, Daejeon (KR)

( * ) Notice: Subject to any disclaimer, the term of this patent is extended or adjusted under 35 U.S.C. 154(b) by 859 days.

(21) Appl. No.: 12/743,107

(22) PCT Filed: Nov. 17, 2008

(86) PCT No.: PCT/KR2008/006762
§ 371 (c)(1),
(2), (4) Date: Sep. 29, 2010

(87) PCT Pub. No.: WO2009/064146
PCT Pub. Date: May 22, 2009

(65) Prior Publication Data
US 2011/0019538 A1  Jan. 27, 2011

(30) Foreign Application Priority Data

Nov. 16, 2007 (KR) .......... 10-2007-0117532
Apr. 21, 2008 (KR) .......... 10-2008-0036844
Aug. 28, 2008 (KR) .......... 10-2008-0084750

(51) Int. Cl.
*H04J 1/16* (2006.01)
*H04L 1/00* (2006.01)
*H04L 12/26* (2006.01)
*H04L 12/28* (2006.01)
*H04L 12/16* (2006.01)
*H04L 12/437* (2006.01)

(52) U.S. Cl.
CPC .............. *H04L 12/437* (2013.01); *H04L 12/26* (2013.01)
USPC ........................................................ 370/225

(58) Field of Classification Search
USPC ........................................................ 370/225
See application file for complete search history.

(56) References Cited

U.S. PATENT DOCUMENTS 6,269,452 B1    7/2001  Daruwalla et al.
6,430,700 B1 *  8/2002  Daruwalla et al. ............. 714/4.1
(Continued)

FOREIGN PATENT DOCUMENTS

CN     1964307        5/2007
JP     2006-270169    10/2006
(Continued)

OTHER PUBLICATIONS

International Search Report for PCT/KR2008/006762, mailed Jun. 26, 2009.
(Continued)

*Primary Examiner* — Mark Rinehart
*Assistant Examiner* — Maharishi Khirodhar
(74) *Attorney, Agent, or Firm* — Staas & Halsey LLP

(57) ABSTRACT

Provided is a failure recovery method in a non-revertive mode of an Ethernet ring network. In an Ethernet ring network, link priorities between nodes or node priorities are determined based on media access control (MAC) addresses and the nodes having blocked ports are determined after failures are recovered from based on the priorities so that the blocked ports can be distributed.

9 Claims, 13 Drawing Sheets

(56) References Cited

U.S. PATENT DOCUMENTS

| | | |
|---|---|---|
| 6,928,050 B2 | 8/2005 | Lynch et al. |
| 2005/0207348 A1* | 9/2005 | Tsurumi et al. ............... 370/241 |
| 2006/0215544 A1 | 9/2006 | Asa et al. |
| 2006/0215546 A1 | 9/2006 | Tochio |
| 2006/0245351 A1* | 11/2006 | Pande et al. ................... 370/216 |
| 2006/0271645 A1* | 11/2006 | Theimer et al. ............... 709/218 |
| 2007/0253330 A1 | 11/2007 | Tochio et al. |
| 2009/0016214 A1* | 1/2009 | Alluisi et al. ................. 370/228 |

FOREIGN PATENT DOCUMENTS

| | | |
|---|---|---|
| JP | 2006-279279 | 10/2006 |
| JP | 2007-129606 | 5/2007 |
| KR | 10-2007-0088338 | 8/2007 |

OTHER PUBLICATIONS

Zahir Uddin Ahmad et al., "Priority-Base Non-Revertive Behavior of G.8032", ITU-T Draft; Study Period 2005-2008, International Telecommunication Union, vol. 9, Apr. 22, 2008, pp. 1-7.

Zahir Ahmad et al., "Non-Revertive Recovery Mechanism in G.8032", ITU-T Draft; Study Period 2005-2008, International Telecommunication Union, vol. 9/15, Feb. 6, 2008, pp. 1-5.

Zahir Ahmad, et al. "E-Spring DNR Procedure for G.8032", ITU-T Draft; Study Period 2005-2008, International Telecommunication Union, vol. 9, Nov. 26-30, 2007, pp. 1-3.

Jeong-dong Ryoo et al., "Ethernet Ring Protection for Carrier Ethernet Networks", IEEE Communications Magazine, vol. 46, No. 9, Sep. 1, 2008, pp. 136-143.

Masahiro Maruyoshi et al., "Draft ITU-T Recommendation G.8032/Y.1344", TD 395 (WP3/15), ITU-T Draft; Study Period 2005-2008, International Telecommunication Union, vol. 9/15, Jun. 4-15, 2007, pp. 1-20.

"WD55 Output of G.8032 Breakout Group-Ethernet Ring Protection", Sep. 26-28, 2007, pp. 1-55.

Masahiro Maruyoshi, et al., "Draft ITU-T Recommendation G.8032/Y.1344", WD41r2, ITU-T Draft; Study Period 2005-2008, International Telecommunication Union, vol. 9/15, Sep. 24-28, 2007, pp. 1-27.

Screenshop of Contributions to ITU-T SG15 Q9/15 Interim Meeting, Ottawa, Sep. 2007, URL: http://ifa.itu.int/t2005/sg15/xchange/wp3/q9/2007-09-Ottawa/.

Marc Holness, "Ethernet-Shared Protection Ring (E-SPRing)", ITU-T Draft; Study Period 2005-2008, International Telecommunication Union, vol. 9/15, May 1, 2007, pp. 1-47.

Marc Holness, "E-SPRing Handling of Multiple Failures", ITU-T Draft; Study Period 2005-2008, International Telecommunication Union, vol. 9/15, May 1, 2007, pp. 1-7.

Pedro Nunes et al, "Comparison Between NSN/NTT and Nortel Proposals for G.8032", ITU-T Draft; Study Period 2005-2008, International Telecommunication Union, vol. 9/15, Sep. 18, 2007, pp. 1-8.

* cited by examiner

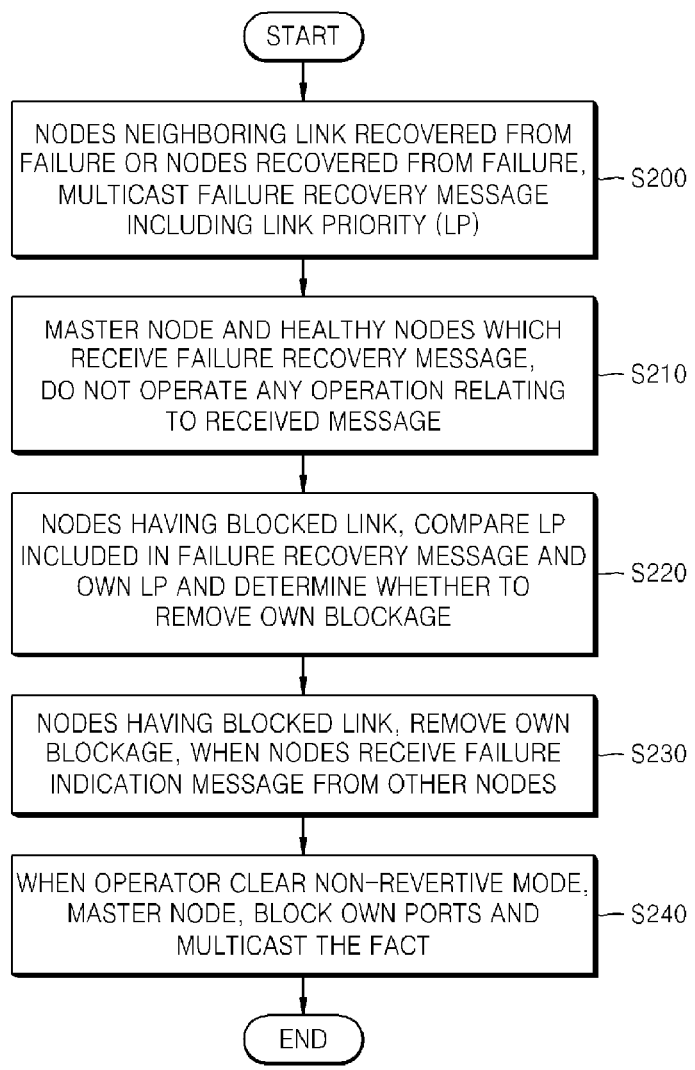

FAILURE RECOVERY METHOD IN NON REVERTIVE MODE OF ETHERNET RING NETWORK

CROSS-REFERENCE TO RELATED PATENT APPLICATION

This application claims the benefit of Korean Patent Application No. 10-2007-0117532, filed on Nov. 16, 2007, Korean Patent Application 10-2008-0036844, filed Apr. 21, 2008, Korean Patent Application 10-2008-0084750, filed Aug. 28, 2008 in the Korean Intellectual Property Office, and International Application No. PCT/KR2008/006762, filed Nov. 17, 2008, the disclosures of which are incorporated herein in their entirety by reference.

BACKGROUND OF THE INVENTION

1. Field of the Invention

The present invention relates to a failure recovery method in an Ethernet ring network, and more particularly to, a failure recovery method in a non-revertive mode where, instead of a master node, a node, in which a failure has occurred, has blocked ports after recovering from the failure.

The present invention is derived from a research project supported by the Information Technology (IT) Research & Development (R&D) program of the Ministry of Knowledge Economy (MKE) and the Institute for Information Technology Advancement (IITA) [2005-S-102-03, Development of Carrier Class Ethernet Technology].

2. Description of the Related Art

A conventional failure recovery method is classified into a revertive mode and a non-revertive mode. The revertive mode returns to a network, which was being used prior to a failure occurring, in which one or two master nodes have blocked ports, whereas in the non-revertive mode, instead of a master node, a node, in which a failure has occurred, has blocked ports.

More specifically, in the revertive mode, when a failure occurs in any one link in an Ethernet ring network where a master node including logically blocked links or ports exists, a blocking in the master node is removed and the link, where a failure occurred, is physically or logically blocked, thereby preventing infinite loop. Then, when the failed link is recovered, the blocked links or ports are established in the master node.

In the non-revertive mode, when a failure occurs in any one link in an Ethernet ring network and then, the failed link is recovered, both side nodes of the failed link located nearest in any one direction from the master node are selected as the blocked ports.

The Ethernet ring network having the blocking is similar to a linear network. Therefore, when such a conventional method is used, the blocked ports or the blocked links are not distributed in the Ethernet ring network and are centered only on the master node or the nodes that are near to the master node. In addition, when new information about a forwarding table is needed in the conventional method, a large amount of information is required in the links that are far from the blocked ports or the blocked links and a small amount of information is required in the links that are near to the master node so that capacities of the links are non-uniform. Also, when a failure occurs in the link of the master node, a processing method thereof becomes complicated.

SUMMARY OF THE INVENTION

The present invention provides a failure recovery method in a non-revertive mode where, instead of a master node, a node, in which a failure has occurred, has blocked ports after recovering from the failure, in order to improve problems in non-uniform capacities of links in an Ethernet ring network.

According to an aspect of the present invention, there is provided a failure recovery method including: when a failure of a link is recovered in an Ethernet ring network, a node adjacent to the link, identifying a priority of the link; and multicasting the first failure recovery message including the priority of the link.

According to another aspect of the present invention, there is provided a failure recovery method including: when a failure of a link is recovered in an Ethernet ring network, a node adjacent to the link, generating a first failure recovery message including a priority of the node; and multicasting the first failure recovery message.

According to an aspect of the present invention, there is provided sequential failure recovery method, the failure occurring in at least two links in an Ethernet ring network, the method including: a node adjacent to a link where the failure occurs, multicasting an FIM indicating that the failure occurred; and removing blocking of the node, when the failure in the link adjacent to the node is recovered from and the failure in the other link is not recovered from.

According to an aspect of the present invention, there is provided simultaneous failure recovery method, the failure occurring in at least two links in an Ethernet ring network, the method comprising: a node adjacent to the links where the failures occur, multicasting a first failure recovery message comprising link priority (or node priority), when the links where the failures occur, are simultaneously recovered; and determining whether to remove blocking of the node based on the link priority (or the node priority) and a link priority (or a node priority) included in a second failure recovery message, when the node receives the second failure recovery message from other nodes.

BRIEF DESCRIPTION OF THE DRAWINGS

The above and other features and advantages of the present invention will become more apparent by describing in detail exemplary embodiments thereof with reference to the attached drawings in which:

FIG. 2A is a flowchart illustrating a failure recovery method based on link priority in a non-revertive mode according to an embodiment of the present invention;

DETAILED DESCRIPTION OF THE INVENTION

The present invention will now be described more fully with reference to the accompanying drawings, in which exemplary embodiments of the invention are shown.

Figure 1:
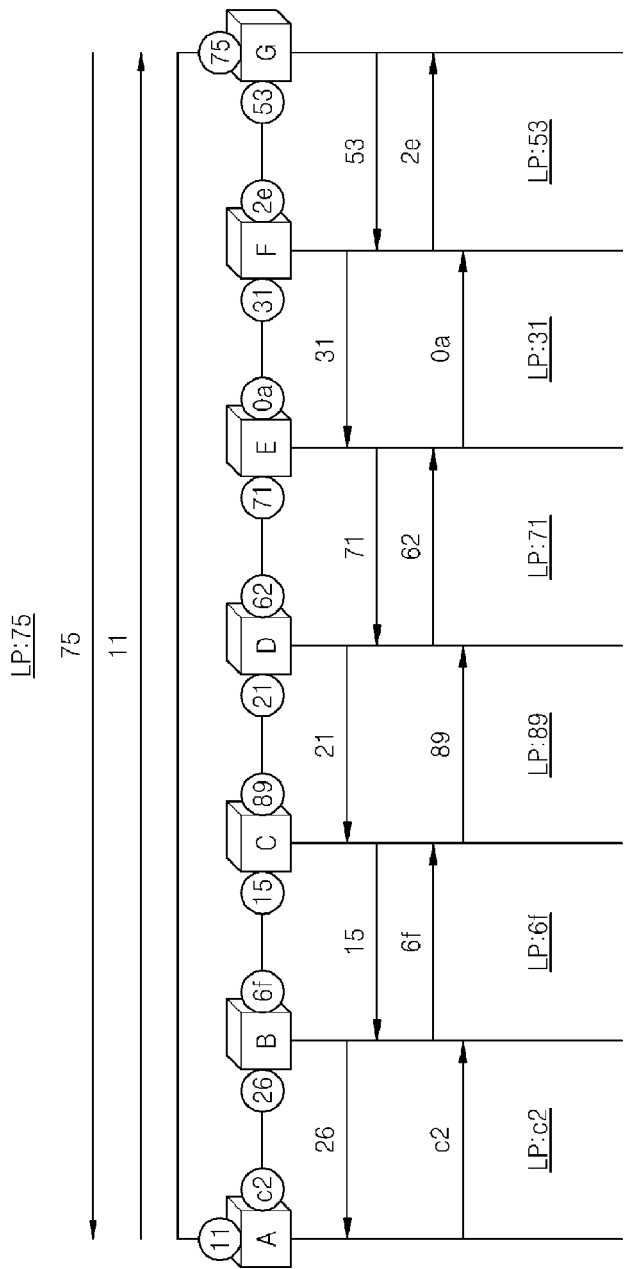
FIG. 1 illustrates determining priority of links according to an embodiment of the present invention.

FIG. 1 illustrates determining priority of links according to an embodiment of the present invention.

Referring to FIG. 1, Ethernet ring nodes (hereinafter, referred to as nodes) have two or more ports in an Ethernet ring network. Each port has a media access control (MAC) address. For example, each port of a node A includes the MAC addresses of 11 and c2 and each port of a node B includes the MAC addresses of 26 and 6f.

Each of the nodes transmits messages for confirming connection of links to neighboring nodes. An example of the connection confirming message includes Ethernet Continuity Check Function (ETH-CC). A source address field or a payload of the connection confirming message includes the MAC address of the source. For example, the node A acquires port information of the node B (that is, the MAC address of the port in a direction of the link connected to the node A: 26) through a message received from the node B and the node B acquires port information of the node A (that is, the MAC address of the port in a direction of the link connected to the node B: c2) through a message received from the node A. Accordingly, each node acquires port information of the neighboring nodes.

The node A and node B compares the MAC address of the port connected to the link which receives the message with the MAC address of the source existing in the payload (or a source address field) of the message received through the link and determines the MAC address having a higher value from among the compared MAC addresses as link priority (LP). Accordingly, the link between the node A and the node B has the LP of the MAC address, c2. Similarly, the link between the node B and the node C has the LP of the MAC address, 6f. The LP is determined between other nodes in the same manner as described above.

In addition to the LP illustrated in FIG. 1, since each node has a node ID, the LP between each node may be determined based on the node IDs. Information about node priority may be shared between the nodes by using the method described with reference to FIG. 1. Node numbers designated by a user may be used as the node priority, in addition to the node IDs, or separate node priority numbers may be given to each node so as to be used as the node priority.

The present invention is not limited to determining the LP or determining the node priority as illustrated in FIG. 1 and the priority may be artificially designated at initial setting of a network or during operating of a network or may be determined by using other methods.

In addition, an Auto Protection Switching (APS) channel and a client channel separately exist in the present invention and frames for a non-revertive mode may be transmitted through the APS channel. Also, there may exist one or more master nodes including blocked channels or links according to embodiments of the present invention.

FIG. 2A is a flowchart illustrating a failure recovery method based on the LP in a non-revertive mode according to an embodiment of the present invention.

Referring to FIG. 2A, the nodes neighboring the link recovered from a failure or the nodes where a failure is recovered from starts operating a guard timer and transmit a non-revertive message including the LP to both directions in operation 200. Here, the guard timer may be set for as long as the time taken for the message to travel around a ring network. When the guard timer is started, the node ignores the messages received during operating of the guard timer. The master node and healthy nodes receive the non-revertive messages and only transmit the message to a next node, but do not perform any operation relating to the received messages, in operation 210.

Another recovered node having the blocked link receives the non-revertive message and compares its own LP with the LP included in the non-revertive message, in operation 220. When the LP included in the non-revertive message is higher, such a node having the link removes the port blocking, otherwise, maintains the current blocked state. Thus, only one link in which both ends are blocked exists in an Ethernet ring network. The recovered nodes having the blocked ports continuously transmit the non-revertive message.

When an unblock confirmation message (UCM) is received from the other node, the recovered node having the blocked port removes its own blocking after completing the guard timer, in operation 230.

In addition, when an operator clears the non-revertive mode, the master node blocks its ports and repeatedly transmits a message indicating that its ports are blocked to a both directions, in operation 240. The nodes having the blockings, which receive the message, clear their port blockings.

Figure 2B:
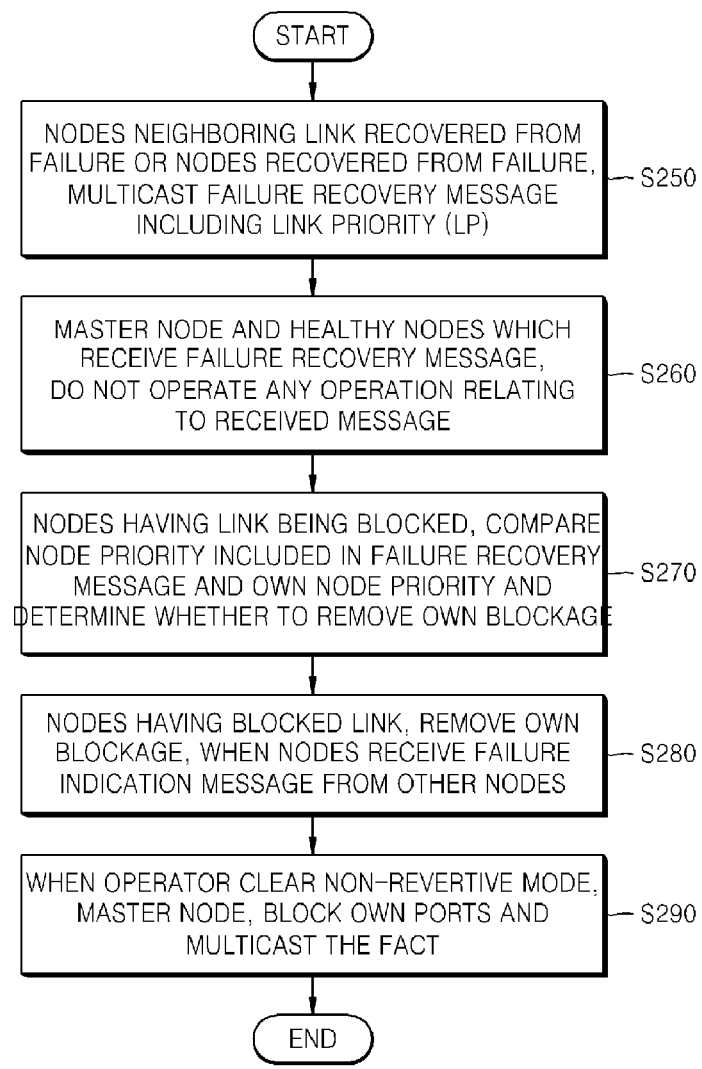
FIG. 2B is a flowchart illustrating a failure recovery method based on node priority in a non-revertive mode according to an embodiment of the present invention.

FIG. 2B is a flowchart illustrating a failure recovery method based on node priority in a non-revertive mode according to an embodiment of the present invention.

Referring to FIG. 2B, the nodes neighboring the link recovered from the sole failure or a last failure, or nodes recovered from a failure, start operating a guard timer and transmit a non-revertive message including the node priority to both directions in operation 250. The node priority may be the node ID of 6 bytes. When another ring port of the node is blocked due to the failure (that is, a local SF state), the blocking of the recovered port is directly removed without multicasting the non-revertive message.

When the master node or the healthy nodes receive the non-revertive messages, the master node or the healthy nodes do not perform any operation relating to the received messages so as for the node recovered from a failure or nodes of the link to maintain ring protected blocking, in operation 260.

Other recovered nodes and nodes having blocked links receive the non-revertive message and compare their own node priority with the node priority included in the non-revertive message, in operation 270. When the node priority included in the non-revertive message is higher, such a node removes the port blocking, otherwise, maintains the current blocked state. Thus, one link in which one end is blocked exists in an Ethernet ring network.

The recovered nodes having the blocked ports continuously multicast the non-revertive message. When the block removal message is received from other node, the recovered node having the blocked port removes its own blocking after completing the guard timer, in operation 280.

In addition, when an operator clears the non-revertive mode, the master node blocks its ports and repeatedly transmits a message indicating that its ports are blocked to a both directions, in operation 290. The nodes having blockings, which receive the message, clear their port blockings.

Figure 3:
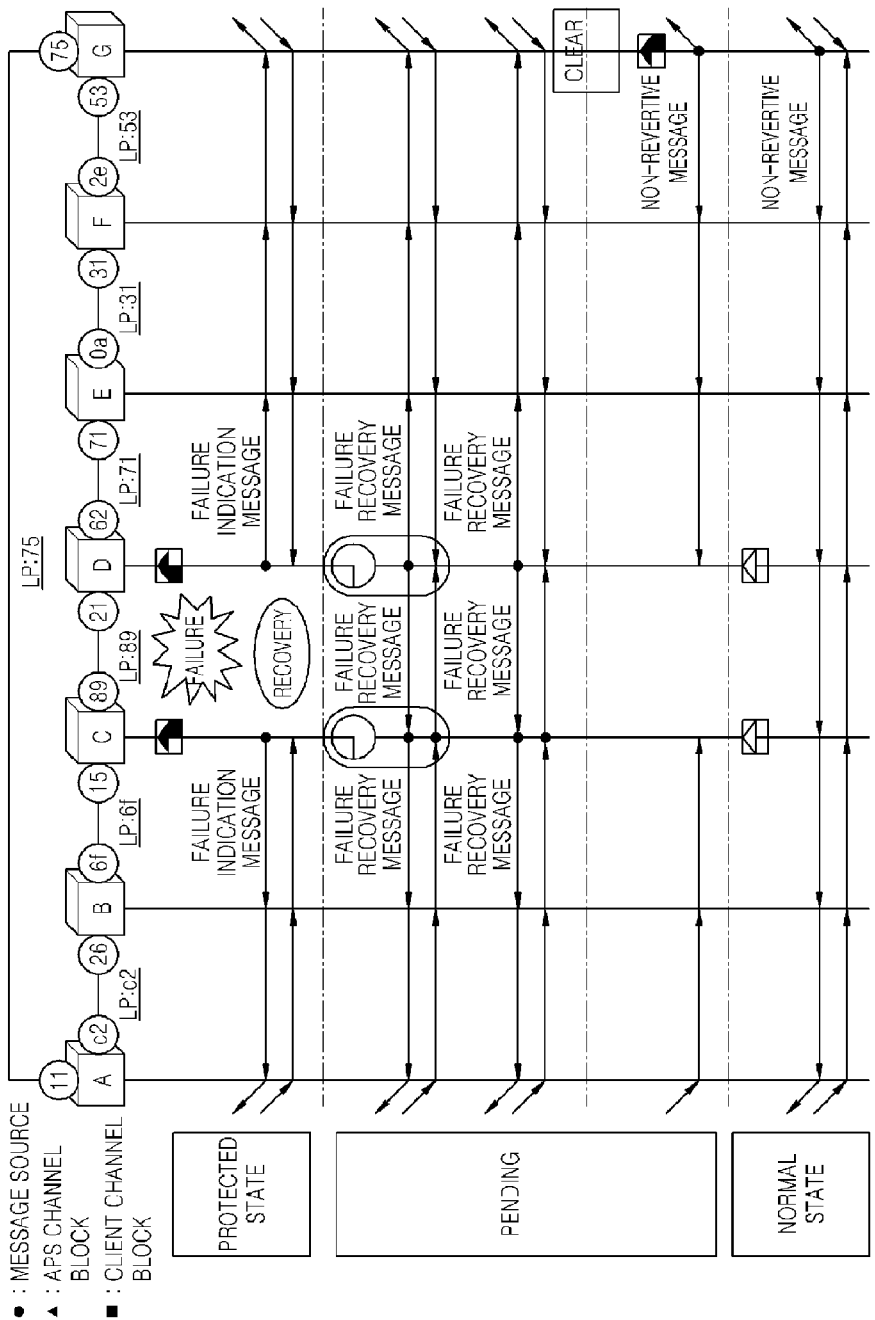
FIG. 3 illustrates a single failure recovery method performed based on link priority when one master node is blocked in an Ethernet ring network according to an embodiment of the present invention.

FIG. 3 illustrates a single failure recovery method performed based on the LP in an Ethernet ring network according to an embodiment of the present invention.

Referring to FIG. 3, when a failure is generated in the link between the node C and the node D, the APS channels and the client channels in the node C and the node D are blocked. Then, the node C and the node D transmit a failure indication message (FIM) indicating that the failure is generated.

When the failure is recovered from, the node C and the node D operate the guard timer and periodically transmit a failure recovery message including the priority of the links, where the failure is generated, to both directions. The node C and the node D remove blocking based on the LP and thus, the blocking of both ends of the link between the node C and the node D is maintained. The recovered nodes having the blocked ports continuously transmit the non-revertive messages.

When an operator clears the non-revertive mode, ports of a node G, that is, a master node, are blocked. That is, the APS channel and the client channel of the node G are blocked. Then, the node G periodically multicasts non-revertive clear messages indicating that the ports are blocked, to both directions. The node C and the node D, which receive the non-revertive clear message, remove their blockings.

Figure 4:
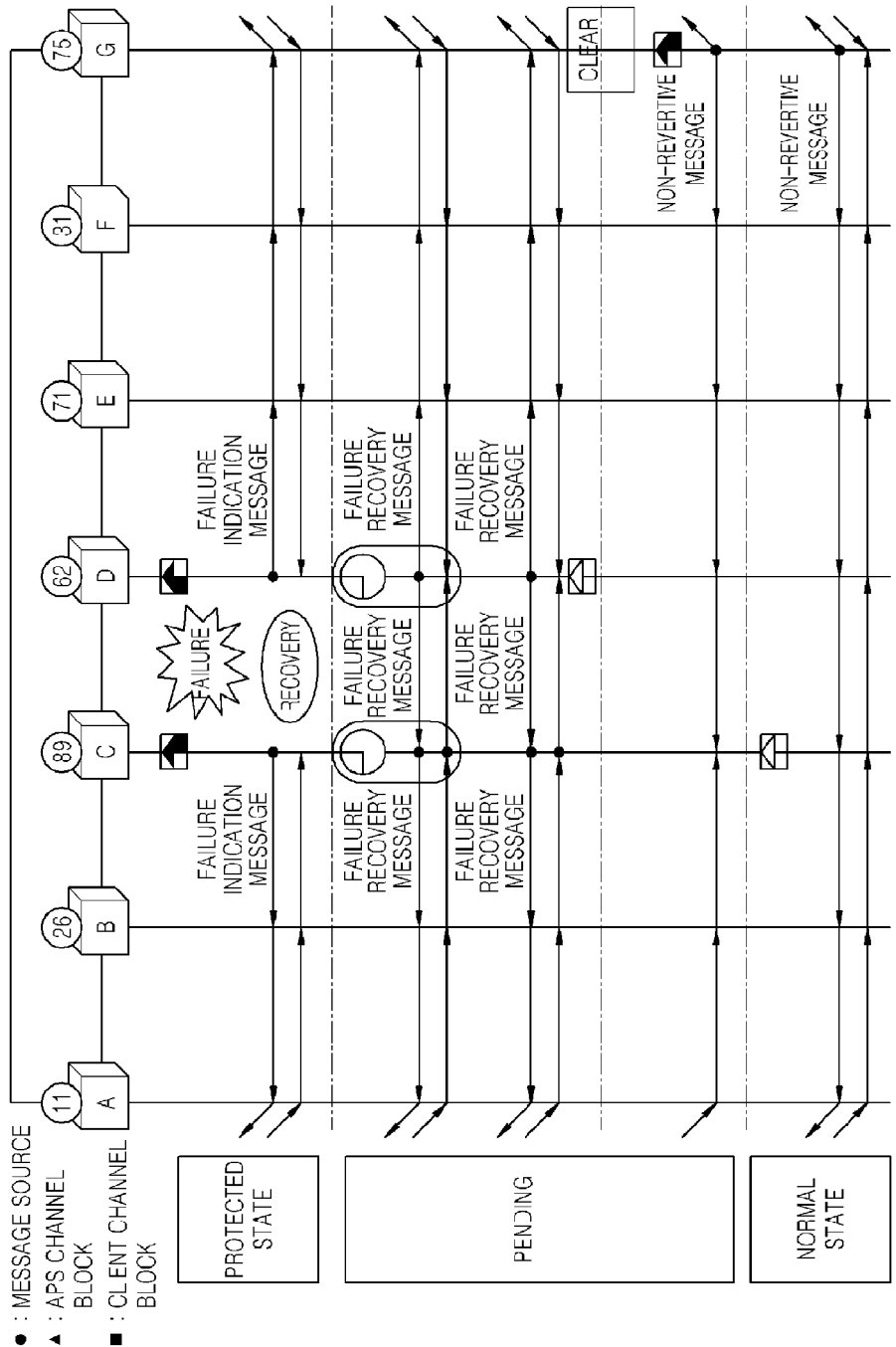
FIG. 4 illustrates a single failure recovery method performed based on node priority when one master node is blocked in an Ethernet ring network according to an embodiment of the present invention.

FIG. 4 illustrates a single failure recovery method performed based on the node priority in an Ethernet ring network according to an embodiment of the present invention.

Referring to FIG. 4, when the a failure is generated in the link between the node C and the node D, the APS channels and the client channels in the node C and the node D are blocked. Then, the node C and the node D transmit an FIM indicating that the failure is generated.

When the failure is recovered from, the node C and the node D operate the guard timer and periodically transmit a failure recovery message including the priority of the nodes, where the failure is generated, to both directions. The node C and the node D remove blockings based on the priority of the nodes and thus, the blocking of the node D having the low priority from among the node C and the node D is cleared.

When an operator clears the non-revertive mode, ports of the node G, that is, a master node, are blocked. That is, the APS channel and the client channel of the node G are blocked. Then, the node G periodically multicasts the non-revertive clear message indicating that the ports are blocked, to both directions. The node C, which receives the non-revertive clear message, removes its own blocking.

Figure 5:
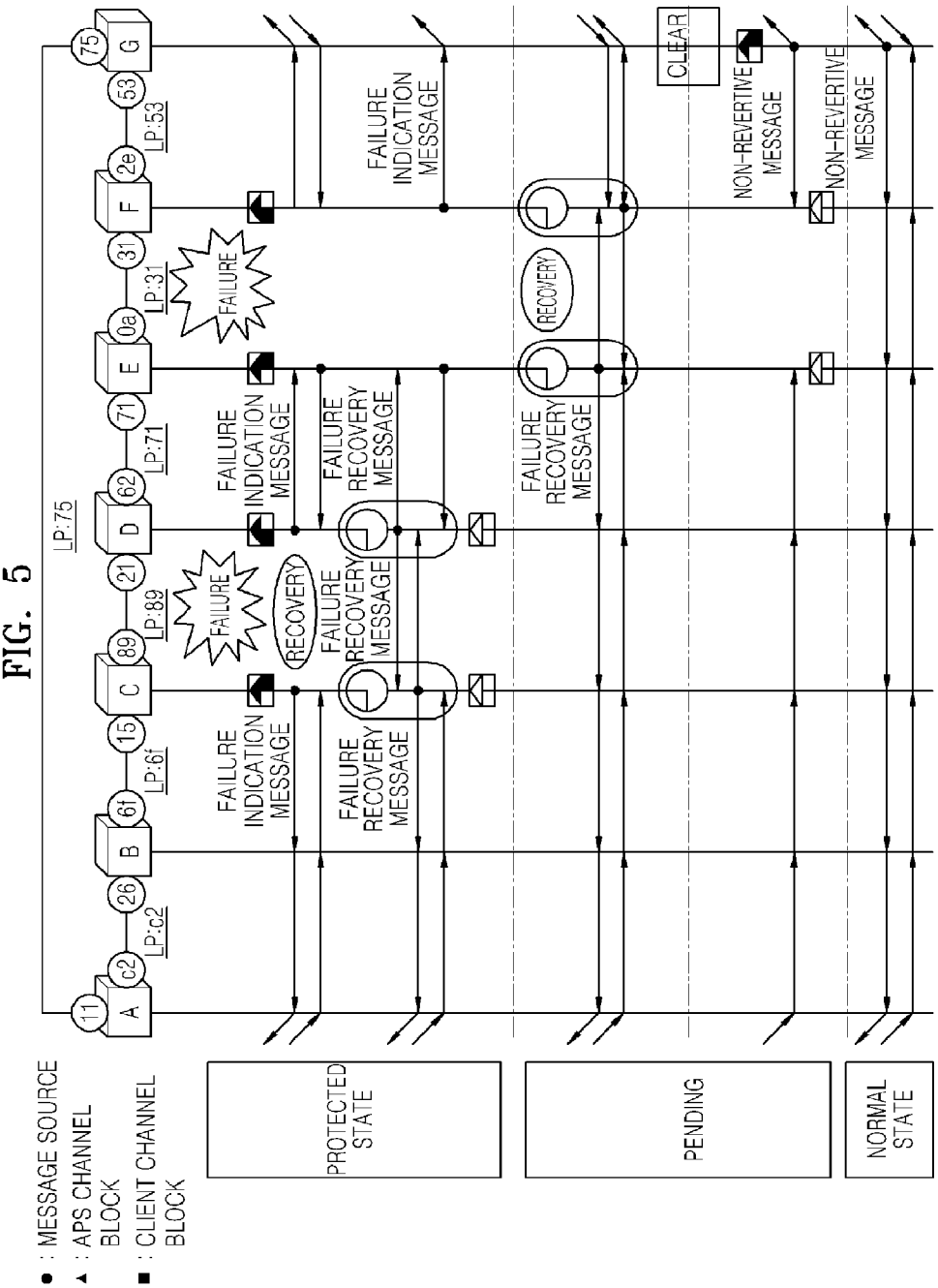
FIG. 5 illustrates a sequential multi-failure recovery method performed based on link priority when one master node is blocked in an Ethernet ring network according to an embodiment of the present invention.

FIG. 5 illustrates a sequential multi-failure recovery method performed based on the LP in an Ethernet ring network according to an embodiment of the present invention.

Referring to FIG. 5, when failures are generated in the links between the node C and the node D and between the node E and the node F, the APS channels and the client channels between the node C and the node D and between the node E and the node F are blocked. Then, the nodes C, D, E, and F periodically transmit the FIMs indicating that the failure occurred.

When the failure in the link between the node C and the node D is firstly recovered from, the node C and the node D operate the guard timer and multicast the failure recovery message including the priority of the link between the node C and the node D.

When the node C and the node D receive the FIM from the node E or the node F which is adjacent to the link where the failure still exists, after the node C and the node D transmit the failure recovery message, the node C and the node D remove their own blockings.

Then, when the failure in the link between the node E and the node F is recovered from, the node E and the node F operate the guard timer and multicast the failure recovery message including the priority of the link between the node E and the node F. In the node E and the node F, since the failure is recovered from based on the LP, the blocking of both ends of the link is maintained.

When an operator clears the non-revertive mode, the ports of the node G, that is, the master node, are blocked. In other words, the APS channel and the client channel of the node G are blocked. Then, the node G periodically multicasts the non-revertive clear message indicating that the ports of the node G are blocked, to both directions. The node E and the node F, which receive the non-revertive clear message, remove their own blockings.

Figure 6:
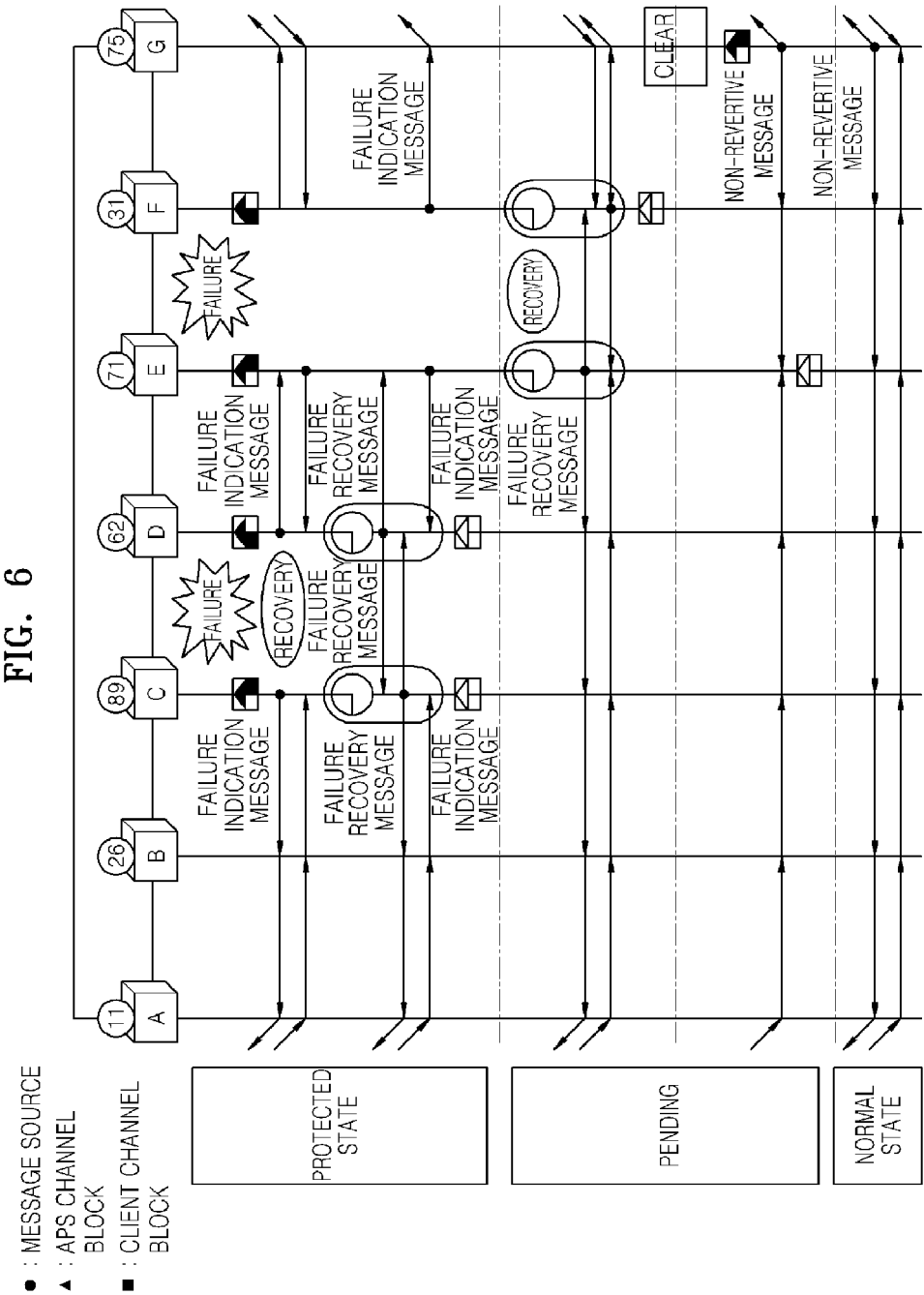
FIG. 6 illustrates a sequential multi-failure recovery method performed based on node priority when one master node is blocked in an Ethernet ring network according to an embodiment of the present invention.

FIG. 6 illustrates a sequential multi-failure recovery method performed based on the node priority in an Ethernet ring network according to an embodiment of the present invention.

Referring to FIG. 6, when failures are generated in the links between the node C and the node D and between the node E and the node F, the APS channels and the client channels between the node C and the node D and between the node E and the node F are blocked. Then, the nodes C, D, E, and F periodically transmit the FIMs indicating that the failures are generated.

When the failure in the link between the node C and the node D is firstly recovered from, the node C and the node D operate the guard timer and multicast the failure recovery message including the priority of the nodes between the node C and the node D.

When the node C and the node D receive the FIM from the node E or the node F which is adjacent to the link where the failure still exists, after the node C and the node D transmit the failure recovery message, the node C and the node D remove their own blockings.

Then, when the failure in the link between the node E and the node F is recovered from, the node E and the node F operate the guard timer and multicast the failure recovery message including the priority of the node between the node E and the node F. In the node E and the node F, since the failure is recovered from based on the node priority, the blocking of the node F having a lower priority among the node E and the F is removed.

When an operator clears the non-revertive mode, the ports of the node G, that is, the master node, are blocked. In other words, the APS channel and the client channel of the node G are blocked. Then, the node G periodically multicasts the non-revertive clear message indicating that the ports of the node G are blocked, to both directions. The node E which receives the non-revertive clear message removes its own blocking.

Figure 7:
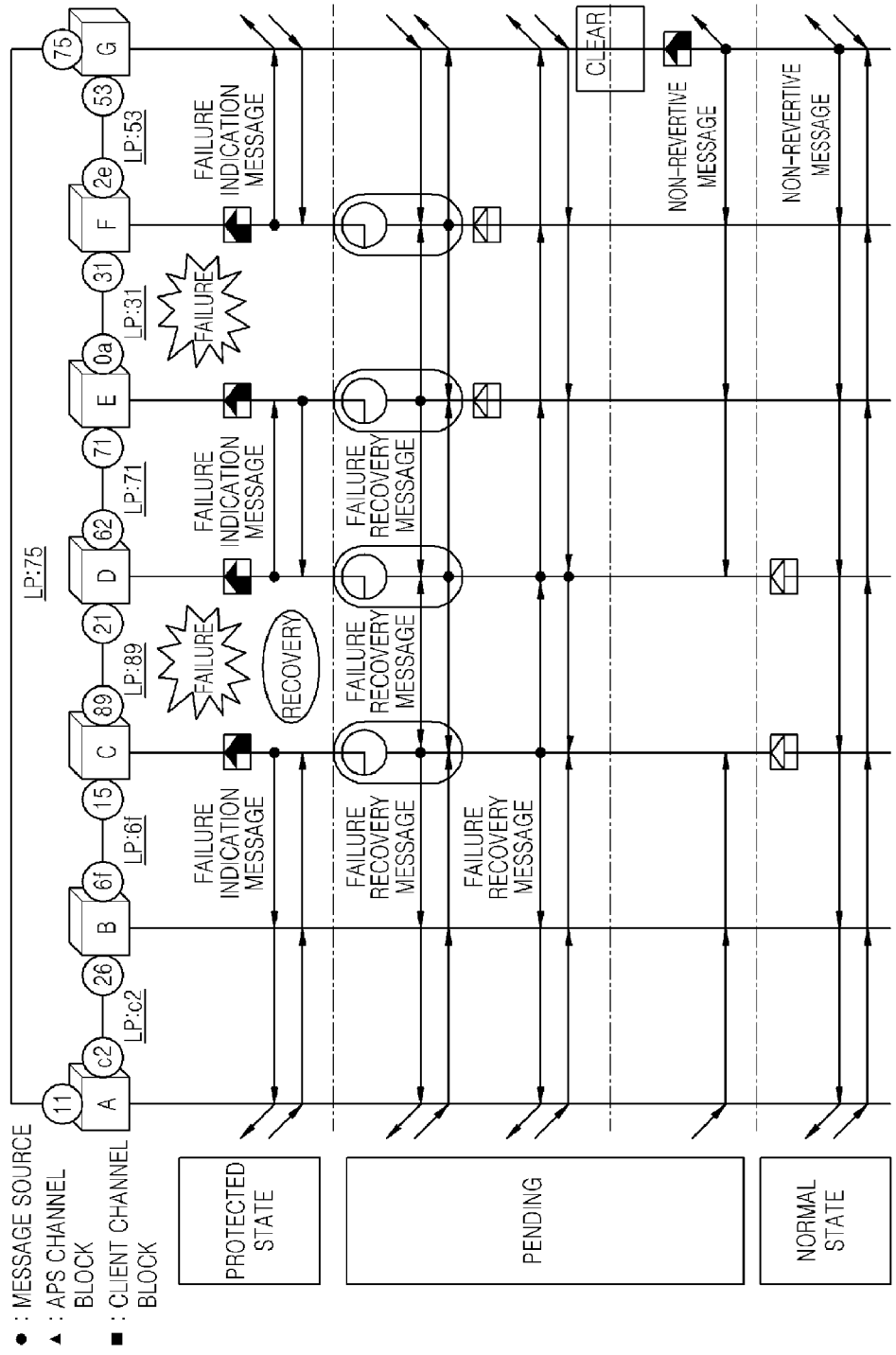
FIG. 7 illustrates a simultaneous multi-failure recovery method performed based on link priority when one master node is blocked in an Ethernet ring network according to an embodiment of the present invention.

FIG. 7 illustrates a simultaneous multi-failure recovery method performed based on the LP in an Ethernet ring network according to an embodiment of the present invention.

Referring to FIG. 7, when failures are generated in the links between the node C and the node D and between the node E and the node F, the APS channels and the client channels between the node C and the node D and between the node E and the node F are blocked. Then, the nodes C, D, E, and F periodically transmit the FIMs indicating that the failures are generated.

When both failures are simultaneously recovered from, the nodes C, D, E, and F adjacent to the links recovered from the failures operate the guard timer and multicast the failure recovery message including the priority of the links recovered from the failures. In other words, the node C and the node D transmit the failure recovery message including the LP of 89 and the node E and the node F transmit the failure recovery message including the LP of 31.

When the nodes C, D, E, and F receive the failure recovery messages transmitted from other nodes, the nodes C, D, E, and F compare the LP included in the received failure recovery message with their own LP and determine whether to remove their own blockings.

For example, when the node C receives the failure recovery message from the node F, the node C compares the LP of 31 included in the failure recovery message with its own LP of 89 and maintains its own blocking, as the LP of the node C is higher than that of the node F.

In addition, when the node F receives the failure recovery message from the node C, the node F compares the LP of 89 included in the failure recovery message with its own LP of 31 and removes its own blocking, as the LP of the node F is lower than that of the node C. According to the method mentioned above, the blocking of the node E and the node F is removed and the blocking of the node C and the node D is maintained.

When an operator clears the non-revertive mode, the ports of the node G, that is, the master node, are blocked. In other words, the APS channel and the client channel of the node G are blocked. Then, the node G periodically multicasts the non-revertive clear message indicating that the ports of the node G are blocked, to both directions. The node E and the node F, which receive the non-revertive clear message, remove their own blockings.

Figure 8:
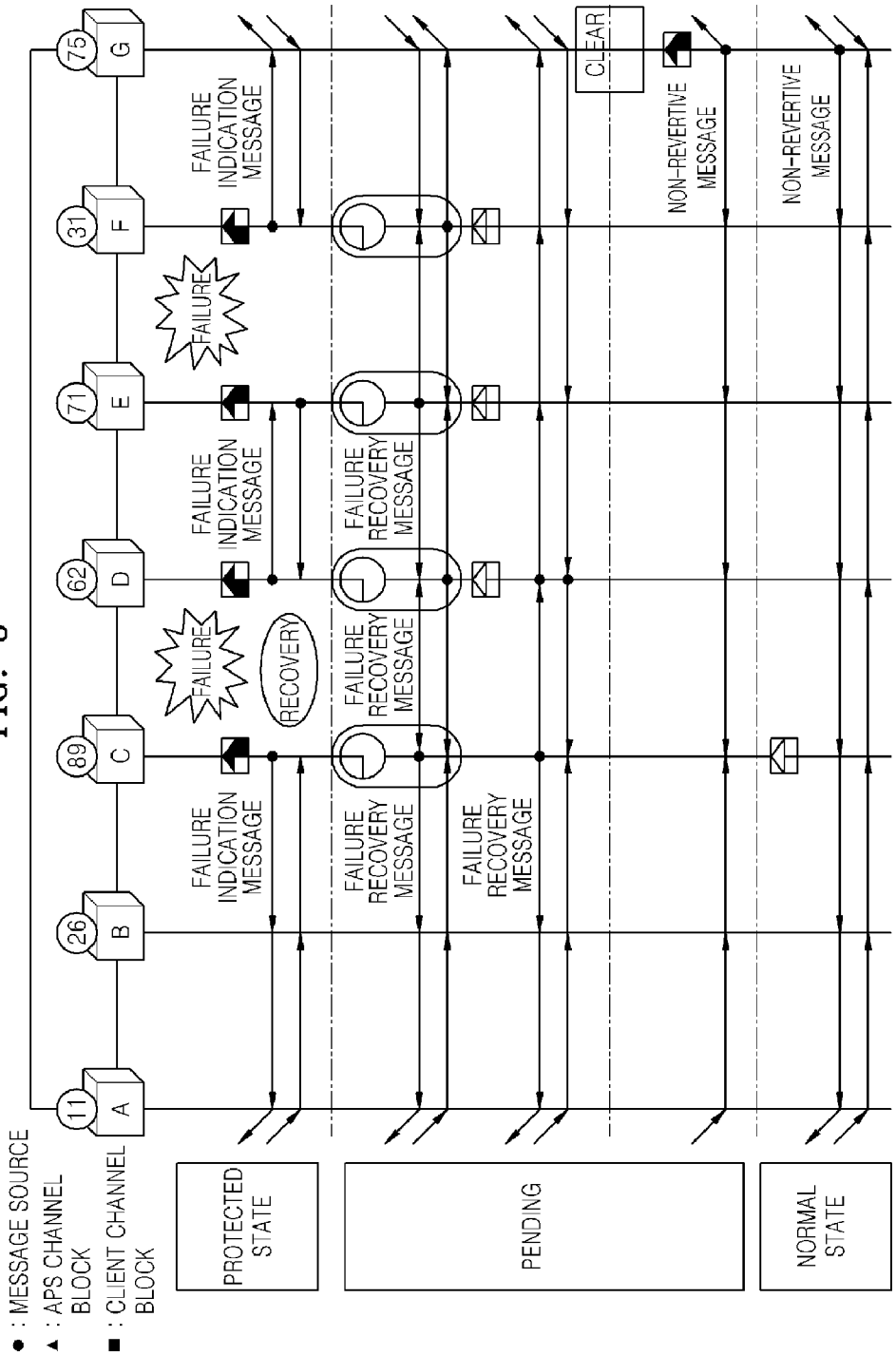
FIG. 8 illustrates a simultaneous multi-failure recovery method performed based on node priority when one master node is blocked in an Ethernet ring network according to an embodiment of the present invention.

FIG. 8 illustrates a simultaneous multi-failure recovery method performed based on a node priority in an Ethernet ring network according to an embodiment of the present invention.

Referring to FIG. 8, when failures occur in the links between the node C and the node D and between the node E and the node F, the APS channels and the client channels between the node C and the node D and between the node E and the node F are blocked. Then, the nodes C, D, E, and F periodically transmit the FIMs indicating that the failures occurred.

When both failures are simultaneously recovered from, the nodes C, D, E, and F adjacent to the links recovered from the failures operate the guard timer and multicast the failure recovery message including the priority of the nodes recovered from the failures. In other words, the node C and the node D transmit the recovery messages respectively including the LPs of 89 and 62 and the node E and the node F transmit the recovery messages respectively including the LPs of 71 and 31. In other words, the node C and the node D transmit the failure recovery message including the LP of 89 and the node E and the node F transmit the failure recovery message including the LP of 31.

When the nodes C, D, E, and F receive the failure recovery messages transmitted from other nodes, the nodes C, D, E, and F compare the node priority included in the received failure recovery message with own node priority and determine whether to remove own blocking.

For example, when the node C receives the failure recovery message from the node F, the node C compares the node priority of 31 included in the failure recovery message with own node priority of 89 and maintains own blocking, as the node priority of the node C is higher than that of the node F.

In addition, when the node F receives the failure recovery message from the node C, the node F compares the node priority of 89 included in the failure recovery message with its own node priority of 31 and removes its own blocking, as the node priority of the node F is lower than that of the node C. According to the method mentioned above, the blocking of the node D and the node E is removed and only the blocking of the node C is maintained.

When an operator clears the non-revertive mode, the ports of the node G, that is, the master node, are blocked. In other words, the APS channel and the client channel of the node G are blocked. Then, the node G periodically multicasts the non-revertive clear message indicating that the ports of the node G are blocked, to both directions. The node C, which receives the non-revertive clear message, removes its own blocking.

Figure 9:
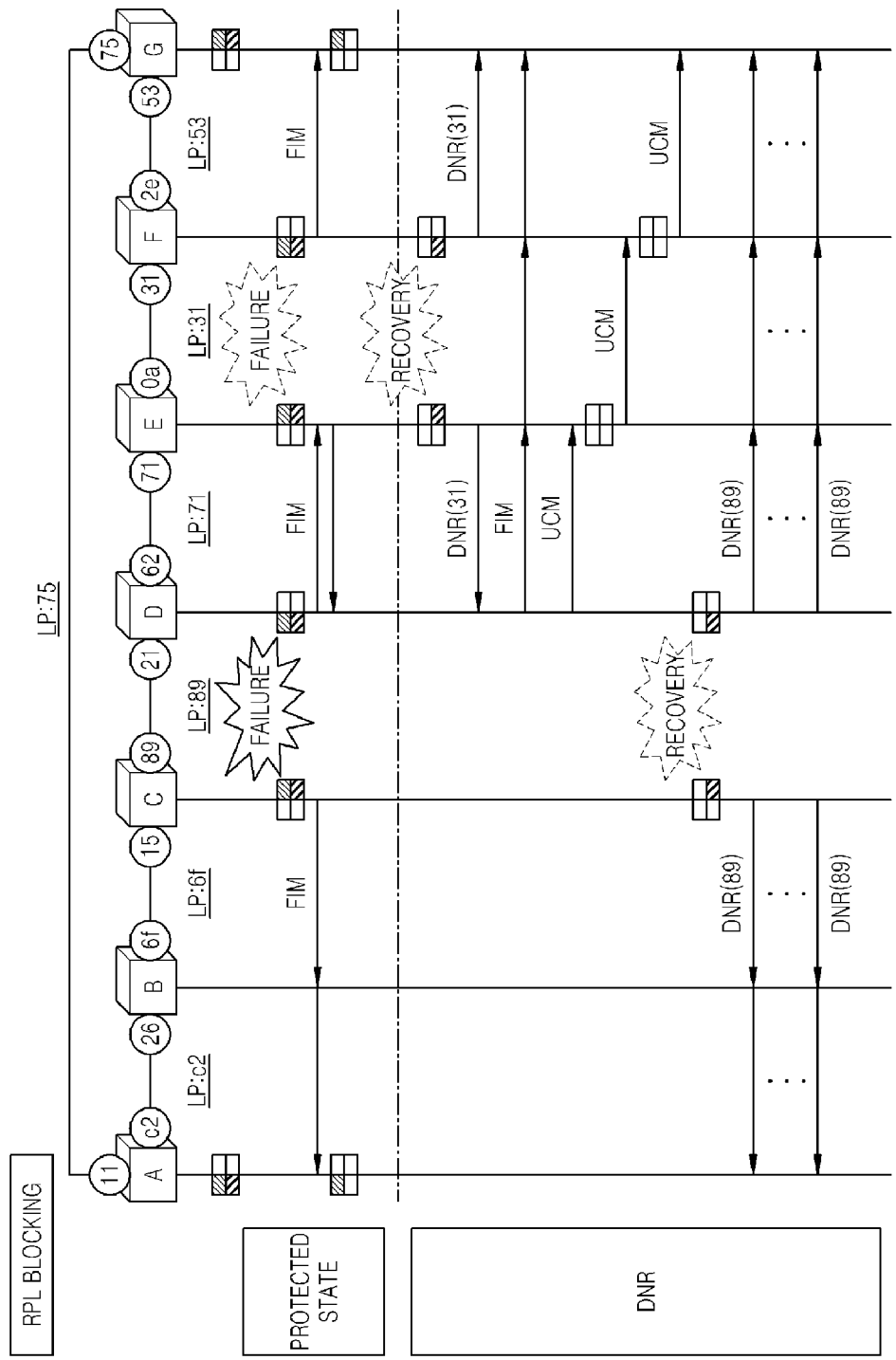
FIG. 9 illustrates a sequential multi-failure recovery method performed by priority of links when two master nodes regularly have an Auto Protection Switching (APS) channel blocked in an Ethernet ring network according to an embodiment of the present invention.

FIG. 9 illustrates a sequential multi-failure recovery method when the master nodes have the APS channel blocked in an Ethernet ring network according to an embodiment of the present invention.

Referring to FIG. 9, when failures are generated in the links between the node C and the node D and between the node E and the node F, the APS channels and the client channels are blocked between the port 89 and the port 21 and between the port 0a and the port 31. Each node located at ends of the link, where the failures occur, periodically transmits the FIMs through ports located in an opposite direction of the link, where the failures are generated.

When the link between the node E and the node F is firstly recovered, the node E and node F do not transmit the FIM but remove blocking of the APS channel. Then, the node E and the node F form Do Not Revert (DNR) frames and record the LP to the payloads of the DNR frames, thereby transmitting the DNR frames in a direction opposite to the recovered ports.

Since the link between the node C and the node D is still failed, transmission of the DNR frames is stopped at the node D. Here, the node D continuously transmits the FIM and thus, the node E, which receives the FIM, removes blocking of the client channel of the port 0a recovered from the failure.

The other method of removing the blocking of the client channel of the port 0a recovered from the failure is as follows. When the node D receives the DNR frames from the node E, the node D sends a UCM through the ports which receive the DNR frames. When the UCM approaches the node E, where the DNR frame is generated, the node E removes the blocking of the client channel. Here, a UCM frame is continuously transmitted to the next node so as to remove the blocking of the node F and is removed by the blocking of the APS channel at the node G. Thus, the failure in the link between the node E and the node F is recovered from.

Then, when the failure in the link between the node C and the node D is recovered from, the node C and the node D remove the blocking of the APS channel and transmit the DNR frame including the LP of 89 in the payload in a direction opposite to the node, where the failure occurs. Finally, the blocking of the APS channel exists between the node A and the node G and the blocking of the client channel exists between the node C and the node D.

Figure 10:
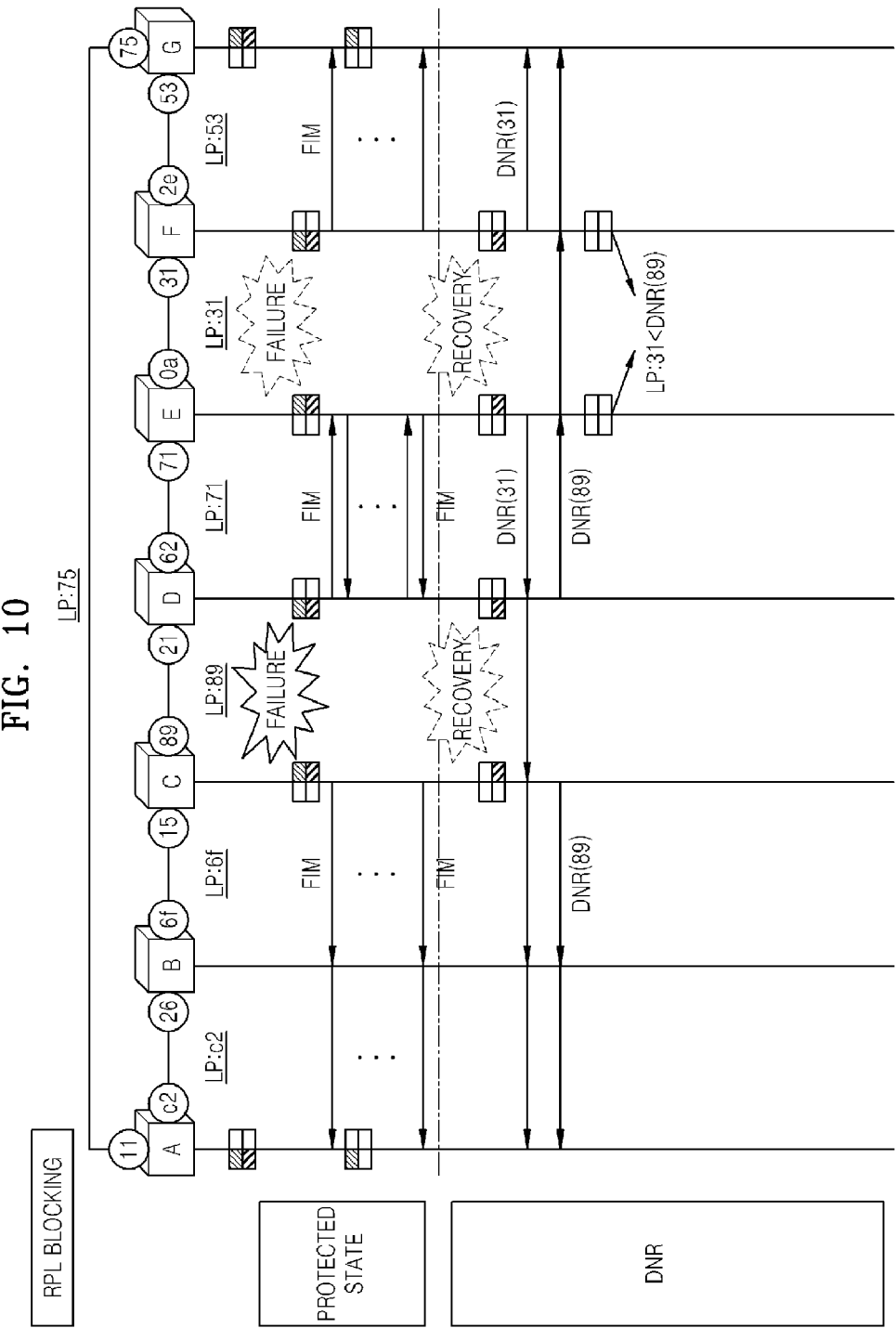
FIG. 10 illustrates a simultaneous multi-failure recovery method performed by priority of links when two master nodes regularly have an APS channel blocked in an Ethernet ring network according to an embodiment of the present invention.

FIG. 10 illustrates a simultaneous multi-failure recovery method when the master nodes have the APS channel blocked in an Ethernet ring network according to an embodiment of the present invention.

Referring to FIG. 10, similarly to FIG. 2, after the failures occur, both side nodes of the link, where the failures are generated, transmit the FIM frames and the master node removes the blocking of the client channel. Then, when the failures are simultaneously recovered from, the nodes C, D, E, and F respectively remove the blocking of the APS channels and apply the priority value of the links where the failures occur, to the payload of the DNR frames, thereby transmitting the DNR frames in a direction opposite to the nodes where the failures occur.

The node D, where the link thereof is recovered from the failure, compares the LP of 89 between the node D and the node C with the LP of 31 between the node E and the node F, the LP of 31 being included in the payload of the DNR frame received from the node E, and maintains or newly sets the blocking of the client channel for the link between the node C and the node D, as the LP of 89 is the same as or higher than the LP of 31. The node E compares the own LP of 31 in the link where the failure occurs, with the LP of 89 received from the node D and removes the blocking of the client channel, as the priority of the link where the failure occurs, is lower. Then, the node D transmits the DNR frame including the LP of 89 to the node F and the node F performs the same process as the node D, thereby removing the blocking of the client channel. Accordingly, the blocking of the APS channel exists between the node A and the node G and the blocking of the client channel exists between the node C and the node D.

Figure 11:
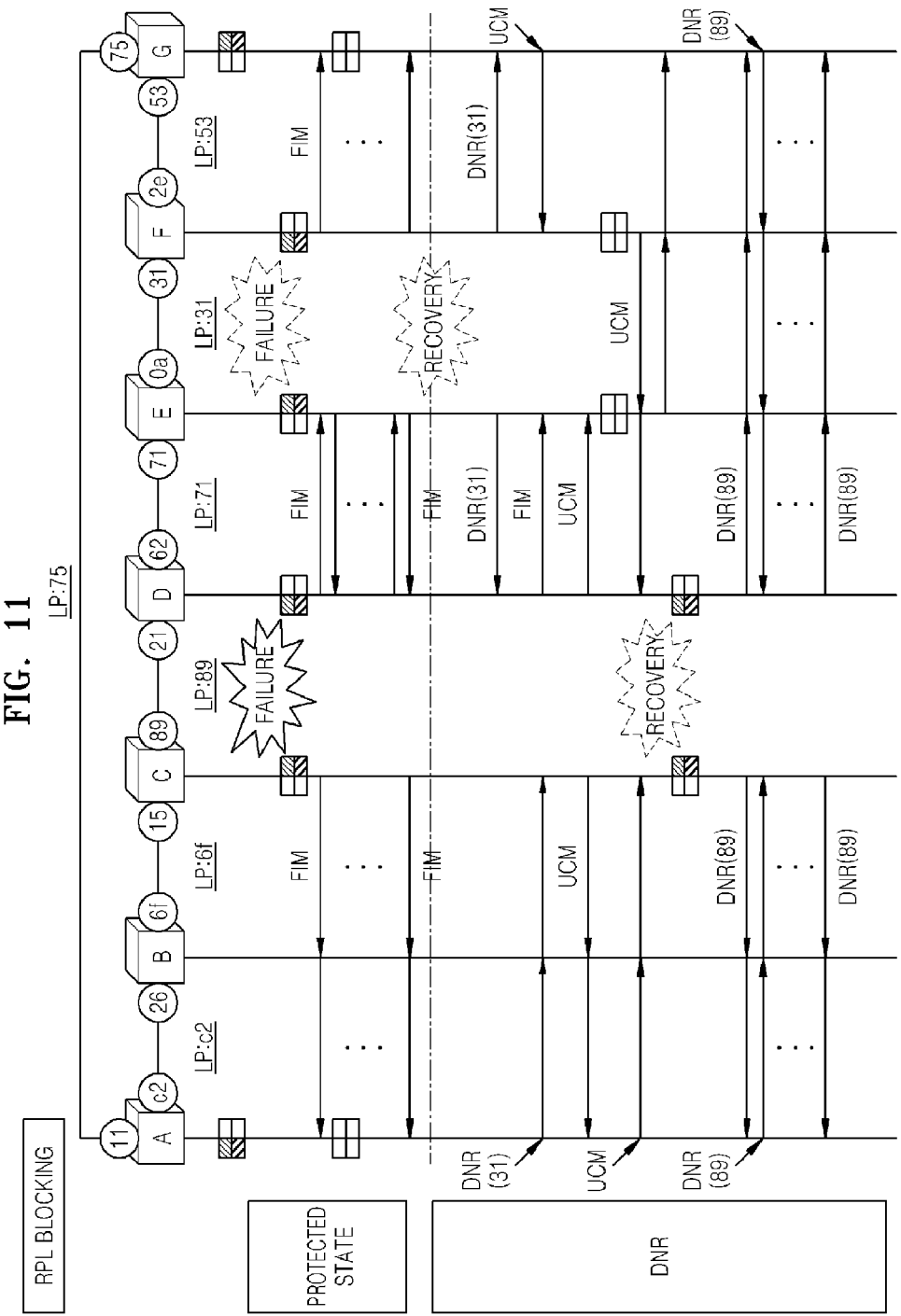
FIG. 11 illustrates a sequential multi-failure recovery method performed by priority of links when an APS channel and a service channel are blocked in a same manner in a same port in an Ethernet ring network according to an embodiment of the present invention.

FIG. 11 illustrates a sequential multi-failure recovery method performed when nodes where the failures occur, have the APS channel blocked in an Ethernet ring network according to an embodiment of the present invention.

Referring to FIG. 11, the failures occur in the links between the node C and the node D and between the node E and the node F and the APS channels and the client channels are blocked at the ports 89, 21, 0a, and 31. Each node, which is connected to the links where the failures occur, periodically transmits the FIM through ports located in an opposite direction of the links where the failures occur. Such FIM frames remove the blocking of the APS channel and the client channel at the node A and the node G, which are the master nodes.

When the link between the node E and the node F is firstly recovered, the node E and the node F generate the DNR frames including values of the LP in the payloads and transmit the DNR frames in a direction opposite to the ports recovered from the failure. Since the link between the node C and the node D is still failed, transmission of the DNR frames is stopped at the node C and the node D. Here, the node D continuously transmits the FIM frames and thus, the node E, which sends the DNR frames, removes the blocking of the APS channel and the client channel of the port 0a recovered from the failure.

The other method of removing the blocking of the port 0a recovered from the failure in the node E is as follows. When the node D connected to the link, where the failure is generated, receives the DNR frames from the node E, the node D sends the UCM to the ports which receive the DNR frames. When the node E receives the UCM from the node D, the node E removes the blocking of the APS channel and the client channel of the port 0a.

The node F generates the DNR 31 and transmits the generated DNR 31 through a port 2e and the DNR 31 is transmitted to the node C through a path formed of nodes G-A-B-C. The node F removes the blocking of the APS channel and the client channel of the port 31 by the FIM received from the node C through a path formed of the nodes B-A-G-F or the node F removes the blocking of the APS channel and the client channel by the transmitted UCM after the node C receives the DNR 31. Then, the failure in the link between the node E and the node F is reverted.

Then, when the failure is recovered from in the link between the node C and the node D, the node C and the node D transmit the DNR frames including the LP of 89 in the payload in a direction opposite to the nodes, where the failures occur. The DNR frame is no longer used in the node where the APS channel has the blocking. The blocking of the APS channel and the client channel exists between the node C and the node D.

Figure 12:
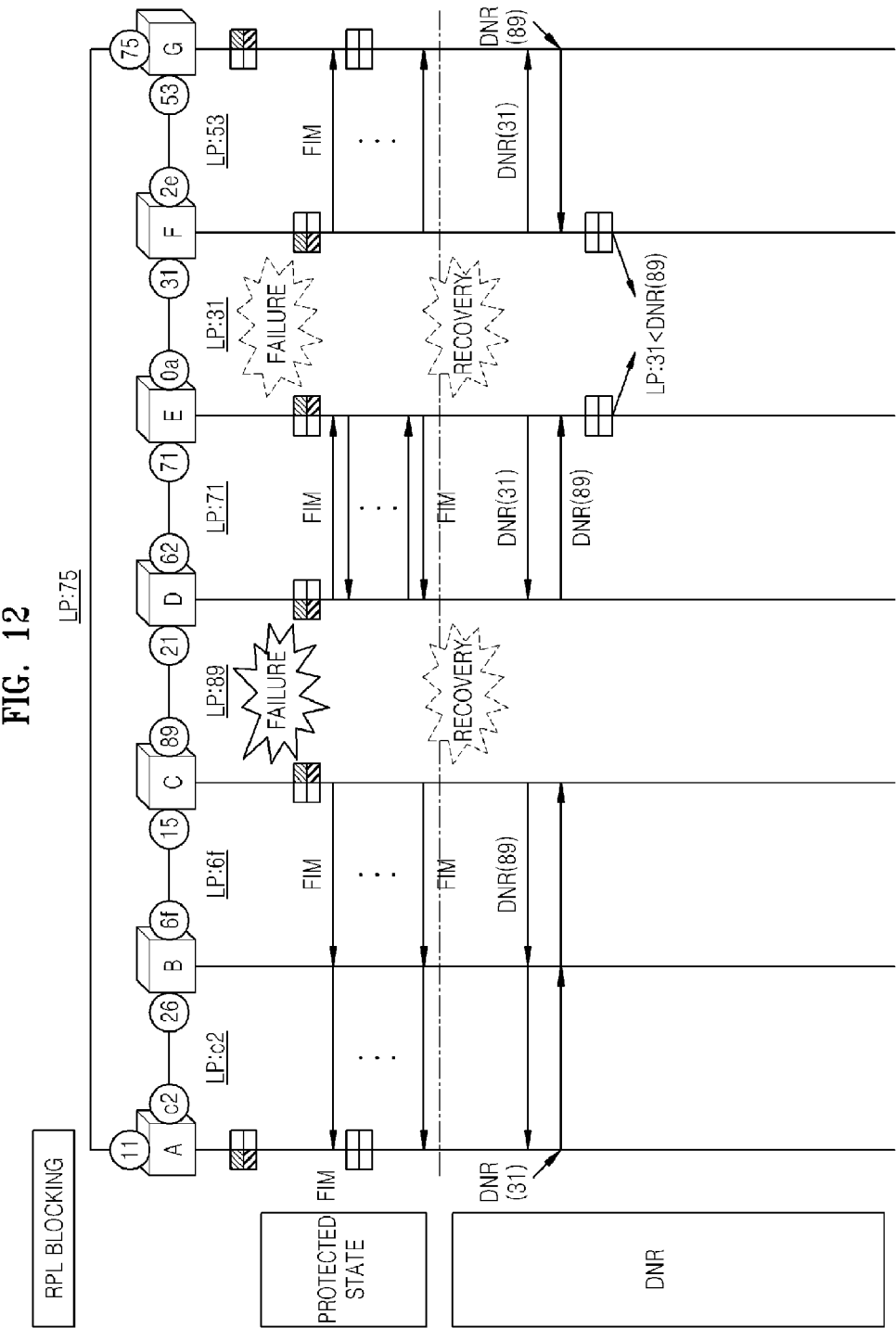
FIG. 12 illustrates a simultaneous multi-failure recovery method performed by priority of links when an APS channel and a service channel are blocked in a same manner in a same port in an Ethernet ring network according to an embodiment of the present invention.

FIG. 12 illustrates a simultaneous multi-failure recovery method when nodes where the failures occur, have the APS channel blocked in an Ethernet ring network according to an embodiment of the present invention.

Referring to FIG. 12, similarly to FIG. 4, when the failures occur in the links between the node C and the node D and between the node E and the node F, each node of the links where the failures occur, transmit the FIM frames in a direction opposite to the links where the failures occur. Such FIM frames remove the blocking of the APS channel and the client channel at the node A and the node G, which are the master nodes.

Then, when all failures are simultaneously recovered from, the nodes C, D, E, and F apply priority values of the links where the failures occur, to the payloads of the DNR frames and transmit the DNR frames in a direction opposite to the links where the failures occur.

The node D receives the DNR frame having the LP of 31 from the node E. Here, the node D compares its own LP of 89 with the LP of 31 of the received DNR frame and removes the DNR frame, as its own LP is the same as or higher than that of the DNR frame. Similarly, the node E compares its own LP of 31 in the link where the failure occurs, with the LP of 89 included in the DNR frame received from the node D and removes the blocking of the APS channel and the client channel, as its own LP is lower. The node F also receives the DNR frame including the LP of 89 and performs similar processes with the node E, thereby removing the blocking of the APS channel and the client channel. With regard to the nodes C, D, E, and F, when the above processes are completed, the blocking of the APS channel and the blocking of the client channel exist between the node C and the node D.

Compared with the conventional failure recovery method in which the master nodes have the blocked ports or a general node which is the nearest to the master nodes in an arbitrary direction, the failure recovery method according to the present invention may solve the problems related to capacity asymmetry of the links, since the blocked ports are distributed while recovering from the failure. In addition, while recovering from the failure, the location of the blocked ports is determined using the link priority and the node priority, which are based on the MAC address, and thus, capacities of the link can be evenly distributed.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A simultaneous failure recovery method, the failure occurring in at least two links in an Ethernet ring network, the method comprising:
    transmitting a first message comprising a priority information of a first node after a failure recovery between the first node and a second node;
    comparing the priority information of the first node to a priority information of other node comprised in a received second message;
    if the priority of other node is higher than the priority of the first node, removing blocking of a port of the first node;
    a node adjacent to the links where the failures occur, multicasting a first failure recovery message comprising link priority (or node priority), when the links where the failures occur, are simultaneously recovered where the priority is determined solely from a larger value from among media access control (MAC) addresses of ports included in two nodes that are adjacent to the link where the failure occurs; and
    determining whether to remove blocking of the node based on the link priority (or the node priority) and a link priority (or a node priority) included in a second failure recovery message, when the node receives the second failure recovery message from other nodes.

2. The method of claim 1, further comprising, removing blocking of the node, when the node receives a message indicating that a master node is blocked.

3. A failure recovery method of a first node in a network, the method comprising:
    transmitting a first message comprising a priority information of the first node after a failure recovery between the first node and a second node;
    comparing the priority information of the first node to a priority information of other node comprised in a received second message; and
    if the priority of other node is higher than the priority of the first node, removing blocking of a port of the first node,
    wherein the other node is a third node, and the second message comprising a priority information of the third node is received after a failure recovery between the third node and a fourth node.

4. The method of claim 3, further comprising,
    if the priority of the other node is lower than the priority of the first node, maintaining blocking of a port of the first node.

5. The method of claim 4, further comprising,
    receiving a clear message from a master node; and
    removing blocking of a port of the first node in response to the clear message.

6. The method of claim 3, further comprising,
    starting a guard timer after a failure recovery between the first node and the second node.

7. The method of claim 3, wherein the priority information of the first node is a node ID of the first node.

8. The method of claim 3, wherein the other node is the second node.

9. The method of claim 3, further comprising,
    if the priority of the third node is lower than the priority of the first node, maintaining blocking of a port of the first node.

* * * * *